United States Patent [19]

Maier

[11] Patent Number: 4,941,783

[45] Date of Patent: Jul. 17, 1990

[54] DRILLING DEVICE

[75] Inventor: Elmar Maier, Feldkirch-Tisis, Austria

[73] Assignee: Hilti Aktiengesellschaft, Fürstentum, Liechtenstein

[21] Appl. No.: 329,435

[22] Filed: Mar. 28, 1989

[30] Foreign Application Priority Data

Mar. 28, 1988 [DE] Fed. Rep. of Germany ....... 3810540

[51] Int. Cl.[5] ............................................ B23B 51/04

[52] U.S. Cl. ...................................... 408/204; 279/93; 175/330; 285/401; 403/349; 408/226

[58] Field of Search ....................... 408/145, 204, 226; 279/89, 93, 104; 285/401, 402; 403/348, 349; 175/330

[56] References Cited

U.S. PATENT DOCUMENTS

| | | | |
|---|---|---|---|
| 1,051,461 | 1/1913 | Smith | 285/402 X |
| 1,873,241 | 8/1932 | Wright | 403/349 |
| 2,059,496 | 11/1936 | Smith | 279/93 |
| 2,427,085 | 9/1947 | Allison | 408/145 |
| 2,693,343 | 11/1954 | Darin et al. | 285/402 X |
| 3,374,696 | 3/1968 | Trevathan | 408/226 |
| 4,474,488 | 10/1984 | Pinkerton et al. | 403/349 X |
| 4,611,662 | 9/1986 | Harrington | 285/402 X |
| 4,624,608 | 11/1986 | Shiomi et al. | 408/204 X |

FOREIGN PATENT DOCUMENTS 8512878 5/1985 Fed. Rep. of Germany .

*Primary Examiner*—Z. R. Bilinsky

*Attorney, Agent, or Firm*—Toren, McGeady & Associates

[57] ABSTRACT

A drilling device is made up of a hollow cylindrical retainer and an annular drill bit. One of the retainer and drill bit has recesses for receiving projections on the other so that the two parts can be detachably connected together. Each recess has a first and a second axially extending section with the second section extending circumferentially from the opposite axially extending sides of the first section. Accordingly, the second section forms stop shoulders extending transversely of the axial direction for contacting circumferentially extending edges of the projections. As a result, the retainer can transmit rotary motion to the drill bit in both rotational directions while maintaining the two parts in connected engagement.

3 Claims, 1 Drawing Sheet

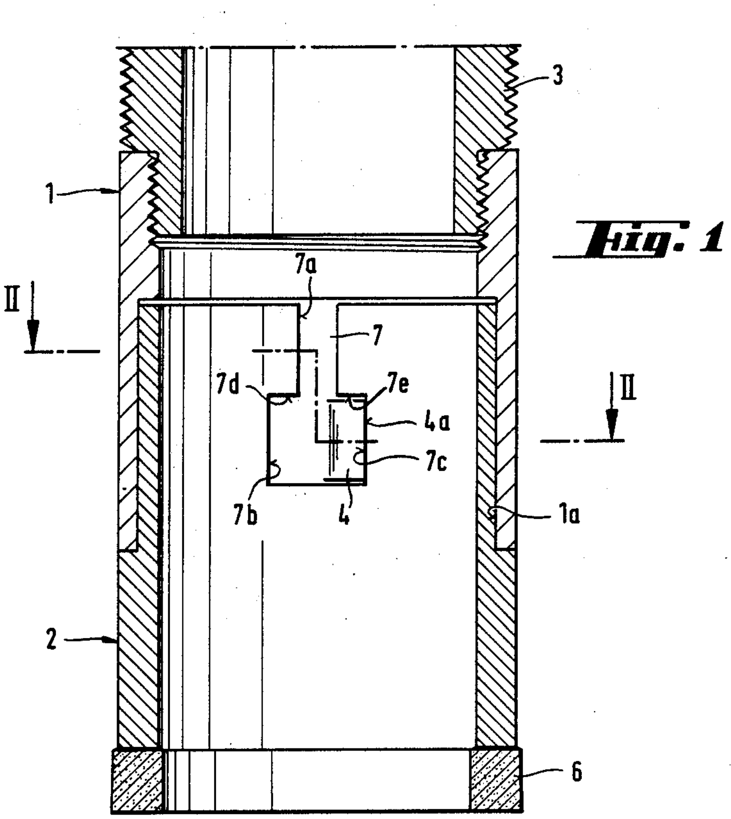
Fig. 1
Fig. 2
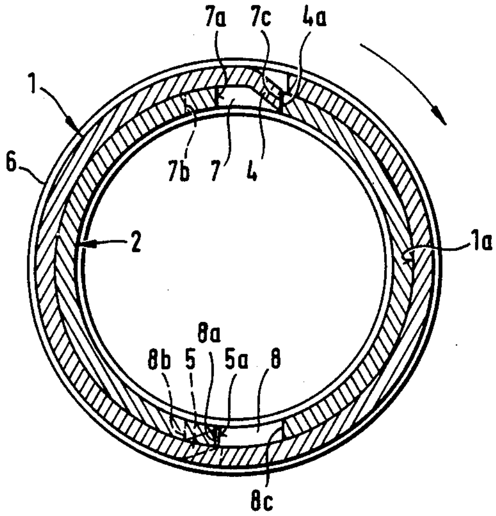
Fig. 3
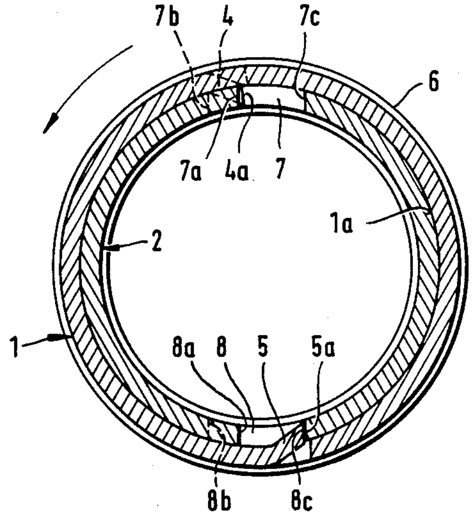

DRILLING DEVICE

BACKGROUND OF THE INVENTION

The present invention is directed to a drilling device formed of the hollow cylindrical retainer and an annular drill bit detachably engageable with the retainer. These two parts overlap in an axially extending region and at least one projection is provided on one part and at least one recess in the other part for receiving and holding the projection. The recess is formed of an axially extending first section followed by an axially extending second section into which the projections can be inserted. The axially extending sides of the second section extend circumferentially from the corresponding axially extending sides of the first section and the width of such extensions corresponds approximately to the width or circumferential dimension of the projection.

In drilling devices with cutting members in the form of drill bits tipped with diamonds and subject to intense wear, it is known, for economic reasons, to connect the drill bit detachably with the retainer so that it can be replaced. In such a drilling device, as disclosed in DE-GM No. 8 512 878, a bayonet-type connection is used between the retainer and the annular drill bit. This known drilling device has the disadvantage that it is difficult to remove it from a borehole. Since rotation for removing the drill bit, counter to the working rotation direction, results in the projection located on the holder or retainer being aligned in the region of a recess on the drill bit open toward an end of the bit. Restoration of the detached connection between the retainer and drill bit is possible only by rotating the retainer with respect to the drill bit in the working direction. To enable removal of the drill bit by the retainer, the projection must be engaged in the closed region of the recess in the drill bit. Such an arrangement presents difficulties in actual practice.

SUMMARY OF THE INVENTION

Therefore, the primary object of the present invention is to provide a drilling device which can be removed in its entirety from a borehole after it is rotated counter to the rotational working direction.

In accordance with the present invention, stop shoulders are formed in a recess or opening symmetrically or uniformly arranged on opposite sides of the recess in an axially extending section of the recess spaced from an end of the part in which the recess is formed. The circumferentially extending stop shoulders extend from the axially extending edges of the first section for a dimension corresponding approximately to the circumferential dimension of the projection on both sides of the section. With the circumferentially extending stop shoulders on both sides of the axially extending section, the projections remain in engagement within the recess or opening in both of the rotational directions of the device, not only in the working direction of rotation. Thus, it is possible to rotate the drill bit opposite to the working direction by means of the retainer for removing the drill bit from the borehole due to the cooperation of the projections and the stop shoulders.

Preferably, the recesses or openings are arranged in the annular drill bit and the projections are formed in the retainer. This is advantageous, particularly when the drill bit has thin walls which are telescoped within the retainer. In the course of regular use of the drilling device, the projections act in the circumferential direction on an axially extending edge or side of the recess, resulting in radial widening and tightening of the portion of the drill bit divided in the axial direction by the recesses. Such an arrangement improves the centering and sealing effect between the drill bit and the retainer.

To achieve low fabrication costs and a sturdy construction, preferably the projections are formed as tangs bent-off from the retainer and extending inwardly from its inside surface. Such tangs or tabs afford a rotational entrainment shoulder effective in the circumferential direction. Such entrainment shoulder can be formed on the free end of the tangs, that is, the end extending circumferentially from the end secured to the body of the retainer.

In a desirable arrangement, the retainer has a pair of projections or tangs with the free ends facing in opposite directions. Accordingly, with one entrainment shoulder serving for the transmission of working torque, the other entrainment shoulder, facing in the opposite direction, can transmit torque opposite to the working direction for loosening or detaching the drilling device. In either rotational direction, the projections or tangs are located opposite a stop shoulder of the recess and assure the continued adequate axial connection of the retainer and the drill bit. By turning the retainer into a middle position relative to the openings or recesses in the drill bit, the tangs are located in the axial projection of a first section forming the entry into the openings, whereby it is possible to pull the retainer axially from overlapping engagement with the drill bit for replacing the bit. If more than two tangs are used, it is preferable that the majority of the entrainment edges face in the rotational working direction with at least one entrainment edges directed in the opposite direction.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is an axially extending sectional view of a drilling device embodying the present invention;

FIG. 2 is a transverse cross-sectional view of the drilling device, taken along the lines II—II in FIG. 1; and FIG. 3 is a cross-sectional view of the drilling device, similar to that shown in FIG. 2, however, with the device rotated in the opposite circumferential direction.

DETAILED DESCRIPTION OF THE INVENTION

In FIG. 1, a drilling device is shown formed of an axially extending hollow cylindrical retainer 1, and an axially extending annular drill bit 2, with the retainer and drill bit in interconnected engagement.

As viewed in FIG. 1, the lower end of the drilling device is the front end and the upper end is the rear end. The drilling direction is in the downwardly extending axial direction of the device. Retainer 1 has a first end, facing in the drilling direction, and an upper oppositely directed second end. At its second end, the retainer 1 is in threaded engagement with a threaded stub 3, extending into the second end of the retainer. Threaded stub 3 provides a connector between the drilling device and a driving unit. Only an axially extending portion of the stub 3 is illustrated. The retainer 1, in the form of a hollow cylinder, has an increased inside diameter surface 1*a*, extending from the first end toward the second end. As viewed in FIG. 1, the upper end of the surface 1*a* forms a shoulder projecting inwardly with the remainder of the retainer having a smaller diameter to its second end where the stub 3 is connected to it. As can be seen in FIGS. 2 and 3, projections or tangs 4, 5 are formed out of the wall of the retainer 1 and project inwardly from the surface 1*a*. The tangs 4, 5 extend circumferentially from their connection to the retainer and have a free axially extending edge 4*a*, 5*a*. These free or axially extending edges on the tangs 4, 5 form rotational entrainment shoulders 4*a*, 5*a* facing in opposite circumferential directions, in other words, as viewed in FIGS. 2 and 3, shoulder 4*a*, faces in the clockwise direction while shoulder 5*a* faces in the opposite or counterclockwise direction.

Annular drill bit 2, also in the form of a hollow cylinder, has a first end, that is, the lower end as viewed in FIG. 1, and an opposite second end. The larger outside diameter of the drill bit is substantially the same as the outside diameter of the retainer 1. From its second end, toward its first end, the outside surface of the drill bit is stepped inwardly so that it fits into the axially extending section of the retainer defined by the surface 1*a*. Accordingly, an axially extending part of the drill bit, extending from the second end, extends telescopically into an axially extending part of the retainer 1. At its first end, the drill bit 2 has a cover ring 6 with diamond grains dispersed in a matrix. The axially extending rearward section of the drill bit 2 telescopically engageable within the retainer 1, has axially extending cutout openings or recesses 7, 8 extending between the inside and outside surfaces of the drill bit, note FIGS. 2 and 3. The openings or recesses 7, 8 are located diametrically opposite one another. Each of the recesses 7, 8 has an axially extending first section 7*a*, 8*a*, extending from the second end of the drill bit toward the first end. A second axially extending section extends from the inner end of the first section 7*a*, 8*a* toward the first end. The axially length of the first and second axially extending sections is approximately the same and is equal to or slightly greater than the axial length of the tangs 4, 5. The first sections 7*a*, 8*a*, have a width or circumferential dimension sufficient to permit passage of the tangs 4, 5 from the second end of the drill bit into the second axially extending sections. The second axially extending sections have opposite axially extending edges or sides 7*b*, 7*c*; 8*b*, 8*c*. Circumferentially extending edges within the second axially extending sections form stop shoulders 7*d*, 7*e*. Similar stop shoulders are formed in the other recess 8, however, they are not illustrated in the drawing.

As displayed in FIGS. 1 and 2, the tangs 4, 5 engage into the parts of the recesses 7, 8, bordered by the edges 7*c*, 8*b* when the drilling device is in the assembled state. The rotational entrainment edge 4*a* of the tang 4, bears against the axially extending edge 7*c* of the recess 7, so that contact is effected in the circumferential direction. The oppositely disposed tang 5 extends into the part of the second section of the recess 8, bordered by the edge 8*b*. When the retainer is driven rotationally in the direction of the arrow in FIG. 2, the entrainment edge 4*a* of the tang 4 transmits rotary driving motion to the drill bit 2. Such rotary motion is in the rotational working direction for the drilling process. Both tangs 4, 5 afford security against axial removal of the drill bit 2 from the retainer 1 due to the coaction between the circumferentially extending stop shoulders 7*e* of the second axially extending section of the recess 7, and the corresponding stop shoulder in the recess 8.

To remove the drilling device from a finished borehole, the drill bit 2, often jammed in the borehole during the drilling operation, can be turned in the direction of the arrow in FIG. 3 to clear the jammed condition. In removing the drilling device, the retainer 1, along with the drill bit 2, is turned in the opposite direction so that the tang 4 moves into the part of the second axially extending section of recess 7, bordered by the axially extending edge 7*b* and the other tang moves into the position bordering the axially extending edge 8*c*, so that rotational motion is transmitted from the retainer to the drill bit. After turning the drilling device, preferably manually, and releasing the jammed condition of the drill bit 2, the drilling device can be withdrawn from the borehole when it is in the position shown in FIG. 3. For such removal, the tangs 4, 5 bear against the stop shoulder 7*d* in the recess 7 and the corresponding shoulder in the recess 8 formed within the parts of the second axially extending sections of such recesses defined in the axial direction by the edges 7*b*, 8*c*.

To disassemble the drilling device, tangs 4, 5 are aligned in the axial direction with the first axially extending sections 7*a*, 8*a* of the recesses 7, 8 by turning the retainer 1 relative to the drill bit 2, whereby the drill bit 2 can be removed from the retainer 1 as the tangs 4, 5 are passed through the first axially extending sections 7*a*, 8*a*. The assembly of the drilling device occurs in the reverse order.

While specific embodiments of the invention have been shown and described in detail to illustrate the application of the inventive principles, it will be understood that the invention may be embodied otherwise without departing from such principles.

I claim:

1. Drilling device having a drilling direction and comprising an axially extending hollow cylindrical retainer with a first end and an opposite second end disposed transversely of the axial direction with the first end facing in the drilling direction, an axially extending annular drill bit detachably connected to said retainer, said drill bit having a first end and an opposite second end disposed transversely of the axial direction with the first end facing in the drilling direction, said retainer and said drill bit being in overlapping relation in the axial direction, one of said retainer and drill bit has at least one circumferentially and axially extending projection extending circumferentially therefrom and the other one of said retainer and drill bit has at least a recessed portion for receiving said projection, said recessed portion extending in the axial and circumferential directions and having a first axially extending section with a circumferential dimension at least equal to the circumferential dimension of said projection extending from one of the first end of said retainer or the second end of said drill bit, and a second axially extending section extending axially from and aligned with said first axially extending section and spaced from the one of the first end of said retainer or the second end of said drill bit, said first section having opposite axially extending first sides, said second section having opposite axially extending second sides, said second sides spaced circumferentially from said first sides and said second section having circumferentially extending shoulders, each extending between one of said first and second sides transversely of the axial direction, and said second sides located circumferentially from each of said first sides for a dimension corresponding approximately to the circumferential dimension of said projection, said second end of said drill bit located between the first and second ends of said retainer and said first end of said drill bit spaced axially outwardly from the first end of said retainer, at least two said recesses are located in said drill bit and a corresponding number of said projections are located in said retainer, said projections are tangs formed and bent off from said retainer with said tangs projecting inwardly of said hollow retainer, and each said tang forming an axially extending edge spaced from a connection of said tang to said retainer with an entrainment shoulder thereon being arranged to bear against one of said second sides for effecting the transmission of rotational movement from said retainer to said drill bit.

2. Drilling device, as set forth in claim 1, wherein said entrainment shoulders of said tangs face in opposite directions in the circumferential direction.

3. Drilling device, as set forth in claim 2, wherein a pair of said tangs and a corresponding pair of said recesses are located diametrically opposite one another.

* * * * *